July 12, 1927.

L. N. GILLIS 1,635,474

FLOOR POLISHING MACHINE

Filed Feb. 12, 1924   2 Sheets-Sheet 1

Inventor
L. N. Gillis.

July 12, 1927.

L. N. GILLIS 1,635,474

FLOOR POLISHING MACHINE

Filed Feb. 12, 1924   2 Sheets-Sheet 2

Inventor

L. N. Gillis.

Patented July 12, 1927.

1,635,474

UNITED STATES PATENT OFFICE.

LYLE N. GILLIS, OF ROSE CREST, VIRGINIA, ASSIGNOR, BY DIRECT AND MESNE ASSIGNMENTS, OF ONE-HALF TO THE FLOOROLA CORPORATION, OF BALTIMORE, MARYLAND, A CORPORATION OF DELAWARE, AND ONE-HALF TO ERNEST J. NEWCOMER, OF BALTIMORE, MARYLAND.

FLOOR-POLISHING MACHINE.

Application filed February 12, 1924. Serial No. 692,296.

This invention relates to floor polishing and scrubbing machines.

One important object of the invention is to provide an improved and compact device for this purpose.

A second important object of the invention is to provide an improved construction especially adapting the machine for floor waxing and scrubbing without danger of splashing water or throwing dust, dirt or wax into the gears of the machine.

A third object of the invention is to provide an improved bearing arrangement for such a machine wherein the stresses will be distributed in an improved manner.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
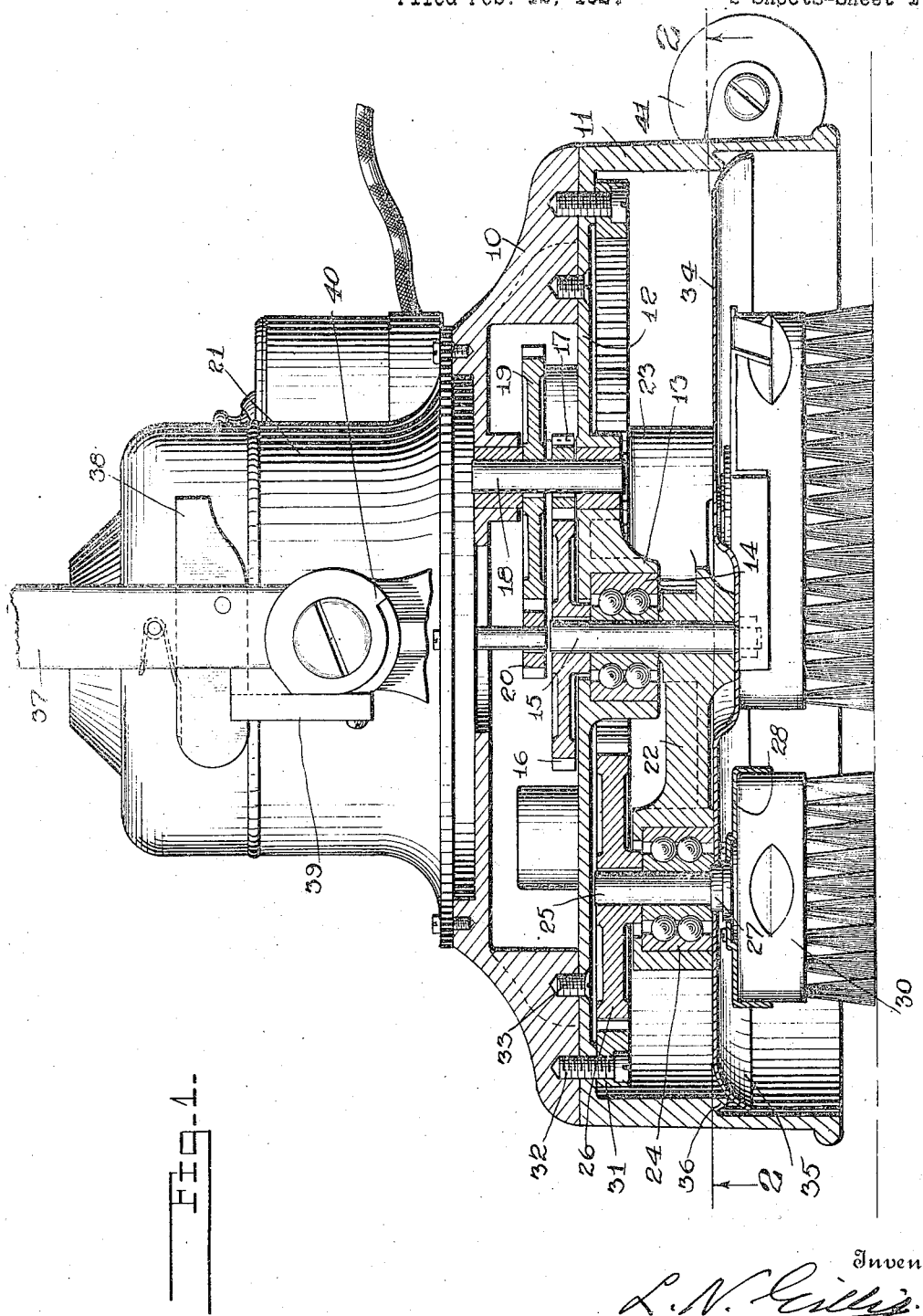
Figure 1 is a side elevation of the machine partly in section.
Figure 2:
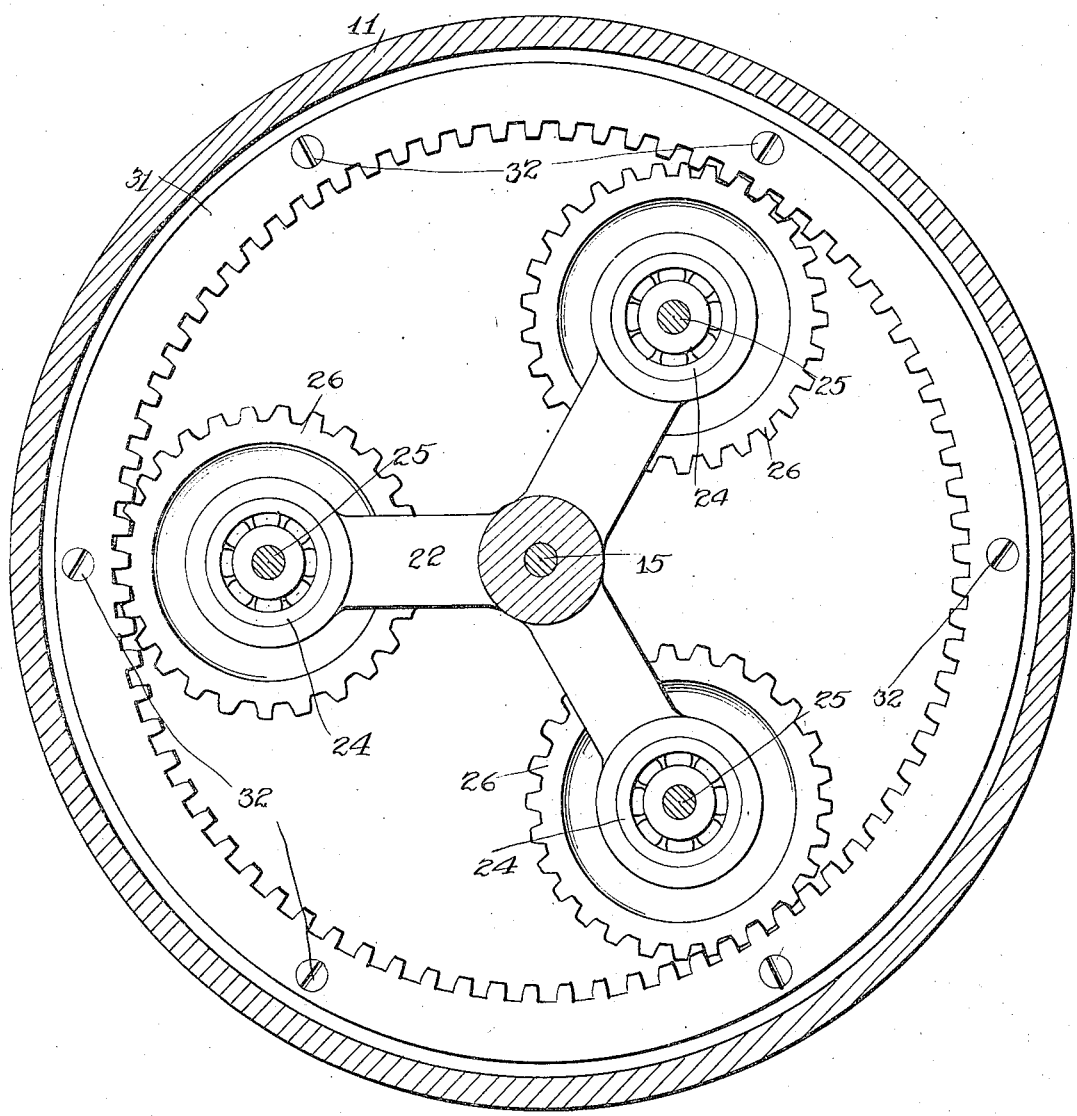
Figure 2 is a section on the line 2—2 of Figure 1.

In this embodiment of my invention there is provided a casing which is divided into two parts, one of these parts 10 constituting an upper casing while the lower part 11 is called the lower casing. This lower casing is provided with a top 12 which forms a horizontal partition between the two casings and is provided with a central bearing boss 13 wherein is mounted the combined radial and thrust ball bearing 14. Mounted in this bearing is a spider shaft 15 which is a driven shaft being provided with a gear 16 having its hub engaging the inner race of the bearing 14. This gear is driven by a pinion 17 fixed on a jack shaft 18 wherein is also fixed a gear 19 driven by a pinion 20 on the shaft of the motor 21. Beneath the top 12 is a spider 22 having its central portion carried by the shaft 15 and engaging in the inner race of the bearing 14, said spider forming a brush supporting means. Each of the spider arms terminates in a bearing boss 23 wherein is mounted a bearing 24 of the same kind as the bearing 14. Each of the bearings 24 supports a brush shaft 25 carrying at its upper end a gear 26 which bears against the inner race of the respective bearing. Each brush shaft has a collar or head 27 bearing on the bottom of said race and carrying a brush holder 28 wherein is mounted a brush 30.

Now with this construction it will be seen the bearings have on one side a driving element and on the other a driven element. In this way the structure is made not only compact but the stresses are held close to the centers of the bearings so that bending strains are eliminated from the shafts and wear is decreased on the bearings.

The gear 26 mesh with a ring gear 31 fixed beneath the top 12 by screws 32. It is to be noted other screws 33 hold the sections 10 and 11 together so that the gear screws may be removed without separating the two sections. At 34 is a guard plate which is provided with a central opening wherethrough may pass the lower end of the shaft 15 and with openings for the shaft 27. This guard plate extends between the brushes and the gears and bearings and its periphery is curved downward as at 35, a trap lip 36 being formed on the interior of the casing 11 and overhanging the guard plate. By reason of this construction no water, dirt, dust or wax can be thrown up into the space above the guard plate.

The usual yoke 37 is provided for the handle and this yoke may be held in vertical position by a spring latch 38 engaging a lug 39 or, by the release of the latch may be tilted down until a shoulder 40 on the yoke engages beneath the lug 39 whereupon further tilting movement will rock the casing down on the carrier wheels 41.

It will be observed that with this construction the use of the machine for waxing or scrubbing does not in any way cause injury to the gearing or bearings and that the compact arrangement and peculiar disposition of the stresses greatly improve the entire structure.

There has thus been provided a simple and efficient device of the kind described and for the purpose specified.

It is obvious that minor changes may be made in the form and construction of the invention without departing from the spirit thereof. It is not, therefore, desired to confine the invention to the exact form herein shown and described, but it is desired to include all such as properly come within the scope claimed.

Having thus described the invention, what is claimed as new, is:

1. In a machine of the character described, the combination of a casing, rubbing means connected with said casing, driving means for said rubbing means, a guard interposed between said rubbing means and said driving means, and a trap lip on the interior of the casing adjacent the guard.

2. In a machine of the character described, the combination of a casing, a shaft substantially centrally mounted in said casing, supporting means carried by said shaft, rubbing means carried by said supporting means, and a guard interposed between the rubbing means and the supporting means.

3. In a machine of the character described, the combination of a casing, a shaft substantially centrally mounted in said casing, supporting means carried by said shaft, rubbing means carried by said supporting means, a guard interposed between the rubbing means and the supporting means, and a trap lip on the interior of the casing overhanging said guard.

4. In a machine of the character described, the combination of an outer casing, a motor supported thereby, rotary rubbing members, shafts to which the latter are attached, gears on the shafts, a support interposed between the rotary rubbing members and the gears, and carrying a guard, and through which the shafts of the rotary rubbing members extend and in which they rotate, an internal gear fixed to the casing above the support and its guard, and meshing with the gears on the shafts, and transmission mechanism extending from the motor to the support for turning the rotary rubbing means.

5. In a floor polishing machine, a casing, a shaft journalled centrally in said casing, a spider mounted on said shaft, brush shafts mounted in the ends of the spider arms, a gear fixed to the casing, gears on said brush shafts meshing with the first mentioned gear, brush holders at the lower ends of the brush shafts, and a guard interposed between the brush holders and spider and arranged to prevent soiling of said gears.

6. In a floor polishing machine, a casing, a shaft journalled centrally in said casing, a spider mounted on said shaft, brush shafts mounted in the ends of the spider arms, a gear fixed to the casing, gears on said brush shafts meshing with the first mentioned gear, brush holders at the lower end of the brush shafts, a guard interposed between the brush holders and spider and arranged to prevent soiling of said gears, and a trap lip on the interior of the casing overhanging the periphery of the guard.

7. In a machine of the class described, a casing having a horizontal partition provided with a central bearing boss, a bearing in said boss, a driven shaft in said bearing, a gear on said shaft above the bearing, a spider on said shaft below the bearing said spider and gear closely engaging the opposite ends of the bearing, arms on said spider having bearing bosses in their ends, bearings in said last mentioned bosses, gears at the upper ends of said bearings, brush shafts mounted in said bearings and carrying said gears, brush holders at the lower ends of said bearings on said brush shafts, a gear fixed to the casing and meshing with the last mentioned gears, and a guard plate carried by said shafts beneath the spider and above the brush holders.

8. In a machine of the class described, a casing having a horizontal partition provided with a central bearing boss, a bearing in said boss, a driven shaft in said bearing, a gear on said shaft above the bearing, a spider on said shaft below the bearing said spider and gear closely engaging the opposite ends of the bearing, arms on said spider having bearing bosses in their ends, bearings in said last mentioned bosses, gears at the upper ends of said bearings, brush shafts mounted in said bearings and carrying said gears, brush holders at the lower ends of said bearings on said brush shafts, a gear fixed to the casing and meshing with the last mentioned gears, a guard plate interposed between the gears and brush holders, and a trap lip on the interior of said casing and extending over the periphery of the guard plate.

In testimony whereof I affix my signature.

LYLE N. GILLIS.